United States Patent Office 3,400,027

Patented Sept. 3, 1968

3,400,027
CRYSTALLIZATION RECOVERY OF SPENT HYDROGEN PEROXIDE ETCHANTS

Kenneth J. Radimer, Little Falls, Frank E. Caropreso, Hamilton Square, and Theodore C. F. Munday, Kendall Park, N.J., assignors to FMC Corporation, New York, N.Y., a corporation of Delaware No Drawing. Continuation-in-part of application Ser. No. 451,635, Apr. 28, 1965. This application Feb. 17, 1967, Ser. No. 616,792
11 Claims. (Cl. 156—19)

ABSTRACT OF THE DISCLOSURE

A spent hydrogen peroxide etching solution, containing residual hydrogen peroxide, sulfuric acid, and dissolved copper is reactivated without substantial loss of $H_2O_2$ values by cooling the solution to precipitate and separate a copper sulfate salt from the solution; the reactivated etching solution thus recovered is used as an etchant per se or is reconstituted with added hydrogen peroxide and sulfuric acid.

Mere cooling of the spent etchant above precipitates a copper sulfate hydrate; cooling of the etchant with added $(NH_4)_2SO_4$ precipitates a double salt of copper sulfate and ammonium sulfate in which the mole ratio of copper to ammonium is 1:2.

CROSS-REFERENCE TO RELATED APPLICATIONS

This application is a continuation-in-part of application number 451,635, filed Apr. 28, 1965 in the names of Frank Caropreso, Kenneth Radimer and Bernard Hogya.

BACKGROUND OF THE INVENTION

A. Field of the invention.—This invention relates to the recovery of unused hydrogen peroxide values from spent etching solutions, and further, to the reactivation of spent hydrogen peroxide etching solutions.

B. Description of the prior art.—Solutions of peroxygen chemicals such as hydrogen peroxide are used to dissolve metallic copper and copper alloys. This is desirable, for example, in place of ordinary machines in order to remove specified amounts of copper from surfaces of fragile or peculiarly shaped objects. A more widespread application of this technique is in the production of printed electrical circuits. In this application a resist or mask in the form of the desired circuit is placed over the surface of a copper film laminated to a base, and the partially masked copper film is treated with the etchant. The copper area not covered by the resist is dissolved while the copper covered by the resist remains to form the desired circuit.

Etchants made up of hydrogen peroxide and a mineral acid such as sulfuric acid, are desirable in such applications because they are clean working, fast acting and are easy to work with. In use, the copper or copper alloy is dissolved in the nonmasked areas by the hydrogen peroxide-containing etchant until the dissolution rate is sufficiently low that it falls below commercially acceptable rates. The resulting spent etchant is then treated to remove the dissolved copper and is disposed of.

One serious problem that has arisen in using this process is that substantial amounts of hydrogen peroxide are discarded in the spent etchant. It has not been possible to recover or make use of the remaining hydrogen peroxide values in the spent etchant on a commercial scale; the mere addition of fresh hydrogen peroxide to a spent etchant solution to restore the original hydrogen peroxide concentration does not yield an acceptable etching solution because such solutions, which contain a large quantity of dissolved copper, give inferior and erratic etching.

A second problem is that the treatment of spent hydrogen peroxide-containing etchants to remove copper entails an additional process step which adds to the expense of disposing of the solutions. Copper must be removed from the spent etching solutions before they are sewered because of the toxicity of the copper values.

As a result there has been a need for a method of treating spent hydrogen peroxide-containing etching solutions on a commercially acceptable basis to recover residual hydrogen peroxide values and to eliminate the expense of copper removal and disposal of the solutions.

SUMMARY OF THE INVENTION

We have now found that spent aqueous hydrogen peroxide etching solutions, which have been used to dissolve copper and which contain residual hydrogen peroxide values, can be reactivated by cooling the solutions to a temperature sufficient to crystallize copper sulfate values from the solution without destroying substantial amounts of residual hydrogen peroxide, separating the crystallized copper sulfate values from the remaining solution and recovering a reactivated solution suitable for etching; the hydrogen peroxide and sulfuric acid concentrations in the reactivated solution may be reconstituted by the addition of fresh hydrogen peroxide and sulfuric acid.

In one embodiment of the present invention ammonium sulfate can be added to the etchant solution in order to facilitate crystallization of copper sulfate-containing crystals. In the latter case, the precipitate is a double salt containing copper sulfate values and ammonium sulfate values. The ammonium sulfate can be added in amounts of from about 0.1–1.5 moles of ammonium sulfate per liter of etching solution; the preferred range is about 0.35 to about 0.7 moles of $(NH_4)_2SO_4$ per liter of etching solution.

DESCRIPTION OF THE INVENTION AND THE PREFERRED EMBODIMENTS

In carrying out the present invention a fresh aqueous etching solution is made up containing 2 to 12% by weight (0.59 to 4.2 M) of hydrogen peroxide and 2 to 23% by weight (0.2 to 2.8 M) of sulfuric acid. The preferred range is 5–10% by weight (1.5 to 3.4 M) of hydrogen peroxide and 3 to 20% by weight (0.3 to 2.4 M) of sulfuric acid. This etching solution may also include stabilizers for the hydrogen peroxide, additives such as $AgNO_3$, phenacetine, urea etc., and wetting agents which may be commonly employed in etching solutions. The resulting etching solution is then heated to a temperature of from about 35 to 60° C. and used to etch unmasked portions of copper. The etching can take place either by conventional immersion etching or spray etching. In the immersion etching process the masked copper work piece is immersed in the solution for the amount of time required to etch the exposed copper surface. In the spray etching technique the hydrogen peroxide etching solution is discharged from a spray nozzle under pressure and the spray impinges on the masked copper work piece.

In practice, the spray etching technique is preferred because it permits shorter etching time and results in a better quality etch. This is due in large measure to the constant replacement of etchant in contact with the work piece and to the removal of the copper-rich layer of etchant in immediate contact with the work piece.

Etching is continued until the solution has been depleted of some of its hydrogen peroxide values and reaches a concentration of about 0.6 to 1.5 M of hydrogen peroxide. At this point, the solution contains anywhere from about 5 to 10 oz. of copper per gallon (about 37 to 75 g./liter) of etchant. While the etchant is capable of dissolving additional copper, the etch rate and quality of etch diminishes and such solutions can be discarded as "spent" solutions if the etch rate and quality fall below required minimums.

This "spent" solution is treated in accordance with the present invention by cooling the solution to a temperature of about −8 to +20° C., until copper sulfate values crystallize and precipitate from the solution. Under these circumstances the precipitate is believed to be copper sulfate pentahydrate. The exact temperature of cooling is not critical, but it is desired that it be sufficiently low to precipitate copper sulfate values from the cooled "spent" etchant. A temperature of −5 to +10° C. is preferred.

If the amount of copper sulfate in the etchant is relatively small, precipitation of the copper sulfate values can be facilitated by evaporating a portion of the water in the etchant by vacuum evaporation followed by cooling of the resulting concentrated solution to precipitate the copper sulfate values. When vacuum evaporation is utilized, the solution is placed under subatmospheric pressure e.g., a few mm. of mercury, and a portion of the water readily vaporizes under the reduced pressure thereby concentrating the remaining solution. During vacuum evaporation, the solution becomes cooled so that no substantial loss of hydrogen peroxide by decomposition occurs during this step.

An alternate technique which can be used to precipitate copper sulfate values, at somewhat higher crystallizing temperatures, is to add ammonium sulfate to the etching solution, preferably just prior to cooling of the solution. The ammonium sulfate can be added in any amount from 0.1 mole to 1.5 moles per liter of etchant; the preferred range is 0.35 to 0.7 mole of ammonium sulfate per liter of etchant. Residual ammonium sulfate does not interfere with the etching to any extent and facilitates subsequent recovery of copper sulfate in the solution. When the spent etchant containing the copper sulfate and the added ammonium sulfate value is cooled, a precipitate is obtained which is a mixed salt of copper sulfate and ammonium sulfate wherein the mole ratio of copper to ammonium is 1:2. The precipitate is believed to be $$CuSO_4 \cdot (NH_4)_2SO_4 \cdot 6H_2O$$

This crystallization step can take place at temperatures of from −2 to +20° C. with temperatures of from about 0 to 10° C. being optimum.

In either case, the resulting sulfate-containing precipitate is separated from its mother liquor by filtering or by centrifugal separators. During this separation, care must be taken to remove residual solution from the precipitate in order to prevent loss of hydrogen peroxide values. If desired, the precipitated crystals may be washed with water to recover any adhering hydrogen peroxide values. The resulting reactivated solution, having a concentration of about 0.6 to 1.5 M hydrogen peroxide, can be used without further processing to obtain good etching of copper until the solution contains about 37–75 g. of copper per liter of etchant (about 5–10 oz. of copper/gal. of etchant). Thereafter the quality and rate of etching again diminishes beyond acceptable values.

An additional and preferred procedure is to reconstitute the treated etching solution, after cooling and crystal separation, by adding hydrogen peroxide and sulfuric acid values to the etching solution until it reaches those concentrations approximating a fresh etching solution.

Such a reconstituted solution can then be used for etching until its hydrogen peroxide content and copper sulfate values reach a point which the etch rate and quality of etch diminishes beyond commercially accepted values. Thereafter, the solution may again be treated by cooling, with or without the addition of ammonium sulfate, to precipitate the copper sulfate values and again be fortified with added hydrogen peroxide and sulfuric acid to reconstitute the etching solution. In this manner, an etching solution may be reactivated and reconstituted repeatedly by cooling the "spent" solution to remove the copper sulfate values and subsequently fortifying the solution with added hydrogen peroxide and sulfuric acid.

In the above described embodiments of the invention, the spent etching solution was first cooled to precipitate the copper sulfate values prior to adding hydrogen peroxide and sulfuric acid to reconstitute the solution. However, it is possible to add hydrogen peroxide and sulfuric acid to fortify a spent solution first and then subsequently cool the solution to crystallize and remove the copper sulfate values. The added sulfuric acid aids in crystallizing more copper sulfate values from the solution by decreasing the amount of salt which can be held in solution in the etchant. In either case the hydrogen peroxide and sulfuric acid values are not affected by cooling and crystallizing the copper sulfate values.

One embodiment of the invention that is contemplated to enable a hydrogen peroxide etching solution to be used indefinitely for etching may be carried out by continuously removing a portion of the etching solution, cooling said portion of the solution to precipitate copper sulfate insolubles, separating the copper sulfate insolubles from the supernatant solution, and recycling the supernatant liquor containing residual-peroxide values back to the main body of etching solution. Simultaneously, hydrogen peroxide is added continuously to the etching solution along with sulfuric acid to maintain the hydrogen peroxide and sulfuric acid values at the desired levels. The main body of etching solution can be used to etch continuously with the cyclic crystallization and refortification procedure until foreign impurities build up in the solution to a point where the quality of etch is affected. Such a process obviates the need for replacing the "spent" etching solution and for added process steps to dispose of the spent solution.

In general, the quality of etch obtained by using a reactivated and refortified hydrogen peroxide etching solution is about the same as that obtained with a fresh hydrogen peroxide etching solution. Thus, the present technique does not necessitate reducing the etching quality currently obtained when using hydrogen peroxide-containing etchants.

The following examples are given to illustrate the present invention and are not deemed to be limiting thereof.

Example 1

One liter of an aqueous etching solution was prepared containing the following molar amounts of ingredients:

| | | |
|---|---|---|
| $H_2O_2$ | M | 2.66 |
| $H_2SO_4$ | M | 2.30 |
| $AgNO_3$ | p.p.m. | 500 |
| Phenacetine | p.p.m. | 500 |

Two hundred milliliters of the above solution were used to etch 15 grams of copper from a copper laminated, printed circuit test panel. The resulting solution, which would normally be considered spent, contained:

| | | |
|---|---|---|
| $H_2O_2$ | M | 1.2 |
| $H_2SO_4$ | M | 1.1 |
| $Cu^{++}$ (10 oz./gal.) | M | 1.22 |
| $AgNO_3$ | p.p.m. | 500 |
| Phenacetine | p.p.m. | 500 |

The above solution was cooled to 0° C. by immersing the solution in a mixed salt-ice bath during which hydrated $CuSO_4$ crystals were formed. The precipitate was separated from the mother liquor and the latter was found to constitute 154 ml. of the total solution; it contained 0.61 mole/liter of $Cu^{++}$ (5.2 oz. of $Cu^{++}$/gal.) and 1.27 moles/liter of $H_2O_2$. The copper sulfate removed constituted about 60–68% of the original copper values present in the solution but only about 2% of the residual $H_2O_2$ was lost or removed. One portion of the mother liquor was then used to etch additional copper-laminated boards with the residual $H_2O_2$ content therein, at commercially acceptable etch rates. The remaining portion of the mother liquor was mixed with enough sulfuric acid to increase the sulfuric acid concentration of the solution to 2.88 M. When this solution was cooled to about 0° C. additional hydrated $CuSO_4$ crystals were precipitated and separated from the remaining mother liquor, further lowering the $Cu^{++}$ content of the mother liquor.

Example 2

Two hundred and fifty milliliters of a partially spent aqueous etching solution containing the following components were cooled to between 1 to 3° C. by vaporizing 50 mls. of the solution under vacuum.

| | |
|---|---|
| $H_2O_2$ | 0.46 M. |
| $H_2SO_4$ | 0.67 M. |
| $Cu^{++}$ | 0.73 M (6.2 oz./gal.). |
| $HgCl_2$ | 5 p.p.m. of Hg. |
| Urea | 50 g./liter. |

Thereafter the 200 ml. solution was cooled further to at least −8° C. by being cooled in a Dry Ice-acetone bath. A precipitate of hydrated $CuSO_4$ and some ice was formed which was separated from the solution. The remaining solution contained all but about 8% of the residual $H_2O_2$ values present in the spent solution and was materially reduced in copper content. The reactivated solution was used to etch additional copper laminates and did so at commercially acceptable rates with its reduced copper content.

Example 3

One liter of an aqueous etchant solution was made up containing the following:

| | |
|---|---|
| $H_2O_2$ | 1.5 M. |
| $H_2SO_4$ | 1.4 M. |
| $(NH_4)_2SO_4$ | 1.0 M. |
| Urea | 50 g./liter. |
| $HgCl_2$ | 5 p.p.m. of Hg. |

Five hundred milliliters of this aqueous solution was used to etch 23 grams of copper from copper-laminated circuit board panels at a temperature of from 30 to 40° C. After etching, the solution contained only 0.35 mole per liter of $H_2O_2$ and 0.73 mole per liter of copper ions (6.22 oz. of $Cu^{++}$/gal. of etching solution). The etching solution was then cooled to 6–7° C. using a bath of a salt-ice mixture, and a crystalline precipitate was obtained. The precipitate was a copper sulfate-ammonium sulfate salt in which the mole ratio of copper to ammonium was 1:2. The precipitate that was separated from the mother liquor contained from about 57 to 63% of the original copper values and about 3–4% of the residual $H_2O_2$ values. The mother liquor was then fortified with added $H_2O_2$ and $H_2SO_4$ to its original level and used to etch additional copper-laminated panels until about 60% of its $H_2O_2$ content was depleted. Thereafter, 0.5 mole of ammonium sulfate per liter of etchant was added to the solution and the solution was cooled to about 5° C. using a salt-ice bath. On cooling, a portion of the solution crystallized yielding a copper sulfate-ammonium sulfate salt as previously described. The mother liquor from this precipitate was refortified with $H_2O_2$ and $H_2SO_4$ and used to etch additional copper-laminated panels. The $(NH_2)_2SO_4$ constituent did not alter the etch rate materially from corresponding etchant solutions containing $H_2O_2$ and $H_2SO_4$ but lacking $(NH_4)_2SO_4$.

Example 4

One liter of aqueous etchant solution was made up containing the following:

| | | |
|---|---|---|
| $H_2O_2$ | M. | 2.2 |
| $H_2SO_4$ | M. | 1.5 |
| AgNo$_3$ | p.p.m. | 500 |
| Phenacetine | p.p.m. | 500 |

Five hundred ml. of this aqueous solution was used to etch copper from copper-laminated circuit board panels at a temperature of from about 45 to 55° C. until the copper concentrations reached 75 g./liter (10 oz. of Cu/gal. etching solution). During the etching process sulfuric acid was periodically added to the etchant to maintain a sufficiently high concentration of $H_2SO_4$ to maintain the etch rate. The etching solution was then cooled to 0° C. using a bath of salt-ice mixture and a crystalline precipitate was obtained. The precipitate contained about 60% of the copper values of the etchant. The precipitate was then separated from the mother liquor and the mother liquor was fortified by adding hydrogen peroxide and sulfuric acid until the concentration of the fortified mother liquor was 1.4 M $H_2O_2$ and 1.2 $H_2SO_4$. The reconstituted etching solution was then used to etch additional circuit boards successfully.

While the above embodiments of the invention are directed to etching with copper, it should be noted that the present invention can be utilized to process $H_2O_2$-containing etchants which have been used to etch aluminum, cobalt, iron, nickel, zinc, magnesium, alloys of these metals or copper alloys. It is preferred to crystallize these metals from the etchant in the form of complex, hydrated ammonium sulfate-containing salts, e.g., the metal sulfate-ammonium sulfate hydrate, by the addition of $(NH_4)_2SO_4$ to the etchant in the manner previously described. These complex salts, e.g. hydrated crystals of cobalt sulfate-ammonium sulfate are in general less soluble than the hydrated metal sulfate salts per se, and therefore permit more complete removal of the etched metal from the $H_2O_2$-containing etchant.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A process for reactivating an etchant solution containing as essential ingredients hydrogen peroxide and sulfuric acid, which has been used to dissolve copper and which contains residual hydrogen peroxide, sulfuric acid and copper sulfate, comprising cooling said solution in the presence of sufficient ammonium sulfate to crystallize copper sulfate values and ammonium sulfate values in a copper:ammonium mole ratio of about 1:2 from said solution without substantially reducing the residual hydrogen peroxide values of said etching solution, separating the crystallized copper sulfate and ammonium sulfate values from the remaining solution, and recovering said remaining solution having etching qualities and etching rates superior to the hydrogen peroxide etching solution prior to reactivation.

2. Process of claim 1 in which said cooling is carried out to temperatures of from about −8° C. to 20° C.

3. Process of claim 2 wherein said cooling is carried out to temperatures of from about −5° C. to +10° C.

4. Process of claim 1 wherein the etching solution contains hydrogen peroxide in concentrations of about 1.0 M to about 3.0 M and dissolved copper in concentrations of about 0.5 M to about 1.2 M.

5. Process of claim 1 wherein said hydrogen peroxide etching solution contains from about 0.1 mole to about 1.5 moles of ammonium sulfate per liter of etching solution prior to cooling of said etching solution to precipitate copper sulfate values.

6. Process of claim 5 wherein said hydrogen peroxide etching solution containing said ammonium sulfate is cooled to about 0° to 10° C. to precipitate said copper sulfate-containing values.

7. Process of claim 5 wherein said ammonium sulfate is added to said etching solution prior to cooling of said etching solution to precipitate copper sulfate and ammonium sulfate values.

8. Process of claim 1 wherein said remaining solution is refortified by the addition of hydrogen peroxide and sulfuric acid thereto in order to increase the concentration of these constituents above that found in said remaining solution.

9. Process of claim 1 wherein sulfuric acid is added to said hydrogen peroxide etching solution prior to cooling said solution to crystallize copper sulfate values therefrom.

10. A process for continuous etching with an aqueous etching solution containing as essential ingredients hydrogen peroxide and sulfuric acid which comprises contacting the etching solution with copper and dissolving copper, removing a portion of the etching solution from the main body of etching solution, cooling said portion of etching solution in the presence of sufficient ammonium sulfate to crystallize copper sulfate values and ammonium sulfate values in a copper:ammonium mole ratio of about 1:2 without substantially altering the residual hydrogen peroxide content of said portion of etching solution, separating the crystallized copper sulfate and ammonium sulfate solids from said portion of etching solution, returning said portion of etching solution free of said crystallized solids to the main body of etching solution, and adding hydrogen peroxide and sulfuric acid to the etching solution to maintain an effective etching concentration of from about 0.6 M to 3.0 M of hydrogen peroxide and 0.5 M to 2.5 M of sulfuric acid.

11. Process of claim 10 wherein ammonium sulfate is present in said portion of etching solution that is removed from the main body of etching solution prior to cooling.

References Cited

UNITED STATES PATENTS

| | | | |
|---|---|---|---|
| 2,908,557 | 10/1959 | Black et al. | 156—19 |
| 3,083,129 | 3/1963 | Jones et al. | 156—19 |

JACOB H. STEINBERG, *Primary Examiner.*